Aug. 30, 1960     S. ENGLESSON     2,950,931

SEALING DEVICE

Filed Sept. 28, 1956

United States Patent Office 2,950,931
Patented Aug. 30, 1960

2,950,931
SEALING DEVICE

Sixten Englesson, Djursholm, Sweden, assignor of one-half to AB Flygts Pumpar, Stockholm, Sweden, a corporation of Sweden Filed Sept. 28, 1956, Ser. No. 612,853

Claims priority, application Sweden Sept. 29, 1955

7 Claims. (Cl. 286—8)

This invention relates to sealing devices arranged between relatively rotatable members and particularly to a sealing device for the shaft of a centrifugal pump adapted to pump sludge or otherwise impure fluids.

More particularly the invention relates to that class of sealing devices comprising separate rotary and non-rotary components having axially cooperating sealing surfaces and being resiliently held in contact with each other.

One object of the invention is to provide a sealing device in the form of a prefabricated unit, which may be assembled and checked outside the machine and in this condition stored for subsequent installation. This makes it especially easy to replace a worn out sealing device on the spot while assuring perfect functioning.

Another object is to provide a unit including two or more sets of cooperating sealing components spaced from each other to divide the leakage path into a corresponding number of separate chambers, said intermediate chambers suitably including a lubricant or the like.

Still another object is to assure a selectable pressure balancing of the sealing components, whereby for example unduly high pressure for sealing purposes may be avoided, thereby preventing excessively fast wear of the components.

Another object is to assure a long life of the sealing components by exposing only minimal parts to the impure and often corroding fluid, said parts further being arranged by centrifugal force to move the impurities away from the sealing surfaces.

Still another object is to assure the sealing effect during the whole life of the sealing device by securing only unaffected surfaces to pass beyond stationary sealing means during the successive displacement due to the continuous wear of the sealing surfaces.

It may be noted that the sealing device according to the invention is especially useful for immersible pump-motor devices particularly for draining impure water, such as sludge or sewage.

Other objects and advantages of the invention will be apparent from the following description taken in connection with the accompanying drawings, wherein—

Figure 1:
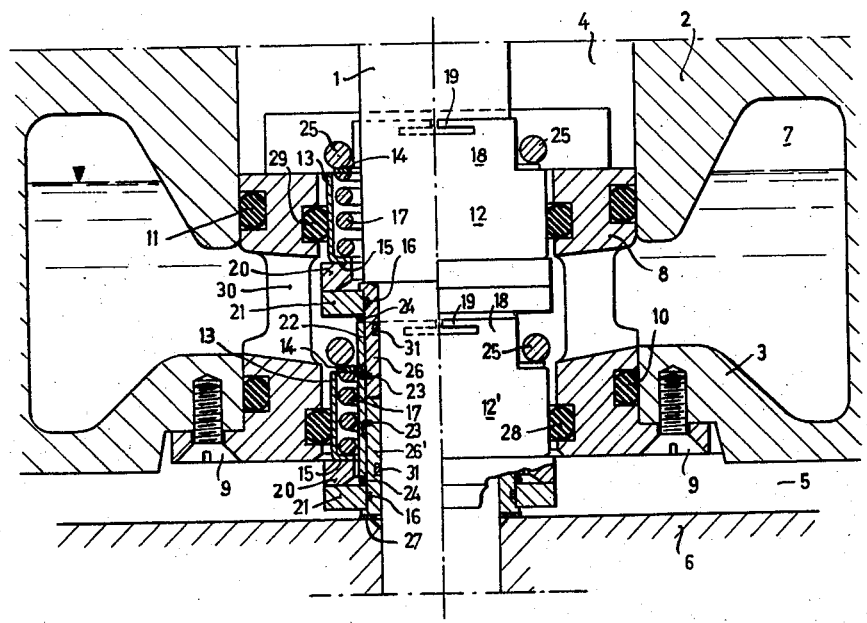
Figure 1 is a fragmentary sectional view which shows to the left a half longitudinal section of the sealing device on the central axis thereof and to the right a half longitudinal section of a housing and surrounding parts of a machine in which the sealing device is mounted.

A rotatable shaft 1 extends through two partition walls 2 and 3 from an upper chamber 4, that may be considered to enclose a driving motor to a lower chamber 5 that as for example encloses a centrifugal pump wheel 6. Between the two partition walls 2 and 3 there is formed a separate chamber 7 surrounding the shaft, said chamber may be closed and partially filled with oil or any other suitable substance that may lubricate the sealing members.

A boring through the walls 2 and 3 surrounding the shaft 1 is essentially larger than the shaft and receives a housing or sealing form 8, as for example secured to the wall 3 by means of screws 9. The housing 8 extends snugly fit through the partition wall 2. O-rings 10 and 11 secure sealing against the partition walls 2 and 3. Said O-rings may, however, be replaced by other sealing means.

The housing 8 has an inner bore with greater diameter than the shaft 1 and includes two spaced coaxial identical sealing elements or units 12, 12'. Said sealing elements consist of an outer sleeve 13 and a washer or annular member 14 axially movable in the sleeve. The lower end portion of the outer sleeve 13 is bent to form an inwardly directed flange 15. Between said flange 15 and the washer 14 a helical compression spring 17 is inserted, said spring urging the washer 14 and the outer sleeve 13 away from each other.

To prevent the different parts to separate in dismounted condition of the sealing elements 12 axial guide or extending portions 18 of the sleeve 13 extend beyond the washer 14 (in mounted condition) and are provided with opposite stoppers 19 in the form of inwardly bent strips of the wall material of the outer sleeve 13.

The lower flange 15 of the outer sleeve 13 is secured to a sealing component or ring 20 of suitable material such as carbon, hard metal or sintered carbides, said sealing ring 20 being non-rotatable relative the housing and cooperating with an opposite sealing component or ring 21, tightly secured to the shaft 1 to rotate with the same. The materials in said relatively rotatable sealing rings 21, 20 are selected for cooperation with each other and are as by way of example of metal and carbon respectively or both of sintered carbide.

Figure 2:
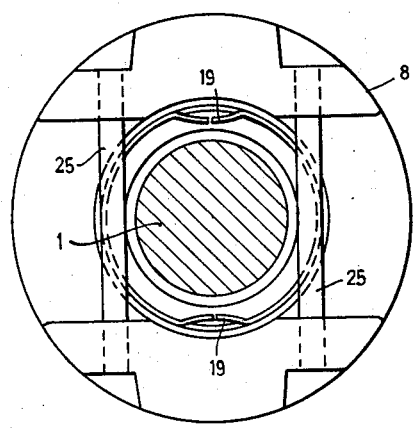
Figure 2 is an elevational view, partly in section, which shows an end as seen from above in Fig. 1.

The sealing elements 12 may be held stationary in the housing 8 by means of two parallel pins 25, which are inserted in parallel bores in the housing on each side of the axially extending portions 18 of the sleeve 13. The pins 25 are suitably on the level with the respective partition wall 2 or 3 so that the latter positively maintains the pins in place. In order to facilitate the drilling of said parallel bores the respective portions of the housing 8 are made flat (Fig. 2).

It is to be noted that the two sealing elements 12 which support the non-rotary sealing rings 20 are identical.

The rotary sealing rings 21 and their supporting members secured to the shaft 1 are likewise identical. Said rotary sealing rings 21 are by means of O-rings 16 tightly pressed against flanged end portions of the two identical distance sleeves 26, 26'. Both distance sleeves are with their free ends facing each other slid over a reduced part of the shaft 1 and rest against a shoulder formed by said reduced portion. Of course the shaft 1 may be of equal diameter and the shoulder formed by a ring member or the like secured to the shaft. The distance sleeves 26, 26' are positively secured to the shaft while being pressed between the centrifugal pump wheel 6 and said shoulder on the shaft 1.

To secure a sealing effect on the inner side of the sleeves 26, 26', each sleeve has one or possibly more O-rings 31 placed in peripheral grooves in the inner sides of the sleeves 26, 26'. Suitably a packing ring 27 is inserted between the lower distance sleeve 26 and the pump wheel 6 to secure an absolute tightness.

To connect the two distance sleeves an additional sleeve 22 surrounds said two sleeves 26, 26' and is removably fastened to these by means of resilient locking rings 23, which are placed in peripheral grooves in the outer side of the distance sleeves 26, 26' and the inner side of the additional sleeve 22 respectively, said grooves having such a cross section as to permit the resilient rings to slightly move radially so that one may pull off the additional sleeve 22 from the distance sleeves 26, 26' with a moderate force. To obtain an effective sealing O-rings 24 are suitably inserted between the sealing rings 21 and the end edges of the additional sleeve 22. Hereby the possible leakage paths are sealed at two spaced points, such as the O-rings 16, 24 and 31, 24 respectively.

Preferably the peripheral grooves in the inner side of the additional sleeve 22, said grooves receiving the locking rings 23, have an extended axial length, so that at a completely mounted sealing device (comprising the housing 8 and the sealing elements 12, 12' including the sealing rings 21), which is not inserted in the machine, the spring 17 is permitted to freely relax without separating the parts out of engagement with each other.

To obtain an effective sealing between the axially movable outer sleeves 13 O-rings 28, 29 or other suitable sealing means are provided between the outside of the sleeve 13 and the wall of the bore in the housing 8.

It is to be noted that the desired pressure balancing of the sealing elements may be varied within large limits and the sleeve 13 may either be made with greater or smaller diameter than the sealing rings 20, 21. I have found a pressure balancing of 50% preferable, that means the cross sectional area of the annular space between the shaft and the sleeve is half the cross sectional area of the sealing ring 21. To obtain a tight sealing of the large clearance between the housing and said sleeves the use of enlarged O-rings 28, 29 have proved sufficient.

Further may be noted that by the invention only very small portions of the sealing members are exposed to said impure fluid and that the impure fluid always tends to be thrown away from the sealing surfaces. Furthermore at wear of the sealing surfaces of the rings 21, 22 always unaffected surface portions will pass beyond the O-rings 28 thereby securing a perfect tightening throughout the life of the device.

As is obvious from the embodiment shown the sealing device according to the invention consists of a number of identical elements each of which may be mounted per se and thereafter inserted into the housing to form a complete sealing device which may then be easily mounted and replaced and which may be run in and checked beforehand.

Further may be noted that the space in the housing 8 between the two sealing elements 12, 12' communicates with the intermediate chamber 7, which may contain a lubricant supplied to the lower sealing member from inside and to the upper sealing elements from outside, so that both rotary sealing surfaces will be perfectly lubricated.

I claim:

1. In a sealing device for sealing a rotating shaft and of the type comprising an outer housing adapted to be secured to a wall surrounding said shaft and including at least two spaced stationary sealing members cooperating each with its rotary sealing member adapted to rotate with the shaft, the combination of sleeve means interconnecting said rotary sealing members and adapted to be secured to said shaft in fluid tight connection therewith, stationary identical resilient units in tight sliding fit within said housing, each of said units comprising a cylindrical body supporting said stationary sealing member at one end thereof, axial compression spring means at the other end of said body and parts integral with said body extending beyond said spring means and having stop means for limiting the stroke of said spring means, and means insertable from the outside of said housing to form the abutment for said spring means and guidance for said extending parts of the cylindrical body for an axial non-rotary movement thereof.

2. In a sealing device as claimed in claim 1, said interconnecting sleeve means comprising two parts adapted in unmounted condition of the sealing device to move apart freely axially a predetermined distance corresponding to said limited stroke of said spring means.

3. In a sealing device for sealing a rotating shaft and of the type comprising an outer housing adapted to be secured to a wall surrounding said shaft and including at least two spaced stationary sealing rings having radial sealing surfaces cooperating each with its radial sealing surface of a rotary sealing ring secured to the shaft, the combination of resilient units in tight sliding fit within said shell and each supporting its stationary sealing ring, each of said units comprising a cylindrical sleeve supporting said stationary sealing ring at one end thereof, an annular member slidable in said sleeve, axial compression spring means within said sleeve between said sealing ring and said annular member, and parts of the wall of said sleeve extending beyond said spring means and provided with inwardly directed stop means for limiting the movement of said annular member by said spring means, and means insertable from the outside of said housing to form the abutment for said annular member and guidance for said extending parts of the sleeve for an axial non-rotary movement thereof.

4. A sealing device for sealing a rotating shaft at least at two axially spaced points, said sealing device comprising an outer housing adapted to be secured to a wall surrounding said shaft and having an inner cylindrical bore, identical sealing units within said bore one at each sealing point, each unit comprising a rotary sealing component adapted to rotate with the shaft and a stationary sealing component adapted to cooperate with said rotary component and comprising a cylindrical body in tight sliding fit within said bore and provided with axial guide means, compression spring means within said body and projecting from the rear end of said body, means integral with said body for limiting the stroke of said spring means, and means insertable from outside of said housing to form simultaneously a peripheral abutment for said guide means for an axial non-rotary movement thereof and an axial abutment for said spring means.

5. A sealing device for sealing a rotating shaft at least at two axially spaced points, said sealing device comprising an outer housing adapted to be secured to a wall surrounding said shaft and having an inner cylindrical bore, identical sealing units within said bore, one at each sealing point, each unit comprising a rotary sealing ring adapted to rotate with the shaft and a stationary sealing component comprising a cylindrical sleeve in tight sliding fit within said bore and larger than said shaft, said sleeve being provided at one end with a sealing ring between the shaft and the outer periphery of the sleeve and adapted to cooperate with said rotary ring, axial guide means at the other end of said sleeve, compression spring means within said body and projecting from the rear end of said body and means integral with said body for limiting the stroke of said spring means, and means insertable from outside of said housing to form simultaneously a peripheral abutment for said guide means for an axial non-rotary movement thereof and an axial abutment for said spring means.

6. In a sealing device as claimed in claim 5 the further feature that the space between said sealing units contains a medium improving the sealing effect.

7. In a sealing device as claimed in claim 6 the further feature that said medium is a lubricant.

References Cited in the file of this patent

UNITED STATES PATENTS

| | | |
|---|---|---|
| 2,601,997 | Lewis | July 1, 1952 |
| 2,612,390 | Lewis | Sept. 30, 1952 |
| 2,746,394 | Dolza et al. | May 22, 1956 |
| 2,831,712 | Kurti | Apr. 22, 1958 |